(12) United States Patent
Morimoto et al.

(10) Patent No.: US 9,396,273 B2
(45) Date of Patent: Jul. 19, 2016

(54) FORENSIC SYSTEM, FORENSIC METHOD, AND FORENSIC PROGRAM

(71) Applicant: UBIC, Inc., Tokyo (JP)

(72) Inventors: Masahiro Morimoto, Tokyo (JP); Yoshikatsu Shirai, Tokyo (JP); Hideki Takeda, Tokyo (JP); Kazumi Hasuko, Tokyo (JP)

(73) Assignee: UBIC, Inc., Tokyo (JP)

( * ) Notice: Subject to any disclaimer, the term of this patent is extended or adjusted under 35 U.S.C. 154(b) by 0 days.

(21) Appl. No.: 14/396,002

(22) PCT Filed: Oct. 9, 2013

(86) PCT No.: PCT/JP2013/077442
§ 371 (c)(1),
(2) Date: Oct. 21, 2014

(87) PCT Pub. No.: WO2014/057964
PCT Pub. Date: Apr. 17, 2014

(65) Prior Publication Data
US 2015/0088876 A1    Mar. 26, 2015

(30) Foreign Application Priority Data
Oct. 9, 2012 (JP) .................. 2012-224587

(51) Int. Cl.
*G06F 7/00* (2006.01)
*G06F 17/30* (2006.01)
(Continued)

(52) U.S. Cl.
CPC .......... *G06F 17/30867* (2013.01); *G06F 17/30* (2013.01); *G06Q 10/10* (2013.01); *G06Q 50/18* (2013.01)

(58) Field of Classification Search
CPC ... G06F 17/30897; G06F 17/30; G06F 7/544; G06F 1/02; G06F 11/34; G06F 17/18; G06Q 10/10; G06Q 50/18
USPC .......................... 707/748, 749, 750, 999.101
See application file for complete search history.

(56) References Cited

U.S. PATENT DOCUMENTS 6,128,620 A * 10/2000 Pissanos et al. .................. 705/2
8,180,781 B2 * 5/2012 Hiraoka ........................ 707/748
(Continued)

FOREIGN PATENT DOCUMENTS

JP    2000511671    9/2000
JP    2005508542    3/2005
(Continued)

OTHER PUBLICATIONS

International Application No. PCT/JP2013/077442, International Search Report mailed Dec. 10, 2013.
(Continued)

*Primary Examiner* — Mohammed R Uddin

(57) ABSTRACT

A forensic system includes a result information receiving unit that receives result information which is a determination result of connection between a lawsuit and a document group including a predetermined number of documents, which is extracted from document data included in digital information, by a user, an element selection unit that calculates evaluation values of elements which commonly appear in the document group in each result information item from the characteristics of the elements and selects the elements on the basis of the evaluation values, a score calculation unit that calculates a score of each document in the document data from the selected elements included in each document of the document data and the evaluation values of the selected elements, and a recall ratio calculation unit that calculates a recall ratio related to the determination of the connection to the lawsuit on the basis of the score.

10 Claims, 6 Drawing Sheets

(51) Int. Cl.
*G06Q 50/18* (2012.01)
*G06Q 10/10* (2012.01)

(56) References Cited

U.S. PATENT DOCUMENTS

| | | | |
|---|---|---|---|
| 8,775,341 B1* | 7/2014 | Commons | 706/20 |
| 2003/0103675 A1* | 6/2003 | Endo et al. | 382/229 |
| 2006/0212698 A1* | 9/2006 | Peckover | 713/151 |
| 2007/0010990 A1* | 1/2007 | Woo | 704/4 |
| 2007/0139231 A1* | 6/2007 | Wallia et al. | 341/50 |
| 2007/0198530 A1* | 8/2007 | Takahashi et al. | 707/10 |
| 2007/0198594 A1* | 8/2007 | Lunt et al. | 707/200 |
| 2008/0195595 A1* | 8/2008 | Masuyama | G06F 17/30616 |
| 2009/0006973 A1* | 1/2009 | Newell et al. | 715/738 |
| 2009/0070101 A1* | 3/2009 | Masuyama | G06F 17/30675 704/9 |
| 2009/0164427 A1* | 6/2009 | Shields et al. | 707/3 |
| 2010/0049769 A1 | 2/2010 | Chen et al. | |
| 2010/0070448 A1* | 3/2010 | Omoigui | 706/47 |
| 2010/0205014 A1* | 8/2010 | Sholer et al. | 705/4 |
| 2010/0205020 A1* | 8/2010 | Losey | 705/7 |
| 2010/0287196 A1* | 11/2010 | Shields et al. | 707/769 |
| 2012/0011153 A1* | 1/2012 | Buchanan et al. | 707/771 |
| 2012/0239666 A1 | 9/2012 | Morimoto et al. | |
| 2012/0246185 A1 | 9/2012 | Morimoto et al. | |
| 2012/0265762 A1* | 10/2012 | Wade et al. | 707/741 |
| 2013/0218940 A1* | 8/2013 | Shannon et al. | 709/201 |
| 2014/0012834 A1* | 1/2014 | Kisin et al. | 707/711 |

FOREIGN PATENT DOCUMENTS

| | | |
|---|---|---|
| JP | 2006235716 | 9/2006 |
| JP | 2011209930 | 10/2011 |
| JP | 2011209931 | 10/2011 |
| JP | 2012032859 | 2/2012 |
| KR | 20080005208 A | 1/2008 |
| KR | 20090060131 A | 6/2009 |
| KR | 20100066263 A | 6/2010 |
| TW | 201009702 | 3/2010 |
| WO | 9748057 | 12/1997 |
| WO | 03040875 | 5/2003 |

OTHER PUBLICATIONS

Korean Patent Application No. 1020157012205, Examination Report mailed Aug. 26, 2015.
Chinese Patent Application No. 201380052823.2, First Office Action mailed Apr. 20, 2016.

* cited by examiner

FIG. 2

DOCUMENT DISPLAY SCREEN

I1

INSTRUCTION MANUAL FOR PRODUCT A AND PRODUCT B

THANK YOU FOR BUYING OUR PRODUCTS A AND B

PRODUCT A IS IMAGE CODING DEVICE THAT COMPRESSES ANALOG DATA OF IMAGE USING ENCODING

PRODUCT A HAS "IMAGE CODING FUNCTION", "LETTER OVERLAP FUNCTION" AND "AUDIO CODING FUNCTION" AS IMAGE ENCODING FUNCTION

PRODUCT B IS IMAGE DECODING DEVICE THAT DECODES IMAGE STREAMS ENCODED BY PRODUCT A INTO ANALOG DATA.
PRODUCT B HAS "DECODING FUNCTION" AND "AUDIO DECODING FUNCTION".

PRODUCT A AND PRODUCT B CAN CONTINUOUSLY OPERATE 24 HOURS A DAY, 365 DAYS A YEAR. IN ADDITION, PRODUCT A AND PRODUCT B ARE GUARANTEED TO OPERATE UP TO HEAT-RESISTANCE TEMPERATURE OF 90 DEGREES.

☐ CLASSIFICATION CODE 1
☐ CLASSIFICATION CODE 2
  · SMALL CLASSIFICATION 1
  · SMALL CLASSIFICATION 2
☐ CLASSIFICATION CODE 3
  ······

FORENSIC SYSTEM, FORENSIC METHOD, AND FORENSIC PROGRAM

CROSS-REFERENCE TO RELATED APPLICATIONS

This application is a national stage application pursuant to 35 U.S.C. §371 of International Application No. PCT/JP2013/077442, filed Oct. 9, 2013, which claims priority to Japanese Patent Application No. 2012-224587, filed Oct. 9, 2012, the disclosures of which are hereby incorporated by reference herein.

TECHNICAL FIELD

The present invention relates to a forensic system, a forensic method, and a forensic program, and more particularly, to a forensic system, a forensic method, and a forensic program for collecting document information related to a lawsuit.

BACKGROUND ART

In recent years, means or techniques have been proposed which collect devices, data, and electronic records required to find or investigate causes, analyzes them, and substantiates legal evidence, when there is a crime or a legal conflict related to computers, such as illegal access or the leakage of confidential information.

In particular, in a U.S. civil suit, electronic discovery (eDiscovery) is required and both the plaintiff and the defendant in the lawsuit have the responsibility to submit all of the related digital information as evidence. Therefore, the digital information recorded in the computer or the server needs to be submitted as evidence.

With the rapid development and spread of IT, most information is created using the computer in the current business world. Therefore, there is flood of digital information within companies.

Therefore, during the pretrial period, when evidence exhibit is submitted to a court, even confidential digital information which is not necessarily related to the lawsuit may be likely included in the evidence exhibit submission. In addition, there is a problem that confidential document information which is not related to the lawsuit is submitted.

In recent years, a technique related to document information in the forensic system was proposed in PTL 1 to PTL 3. PTL 1 discloses a forensic system which designates a specific person from one or more users included in user information of an order to produce documents, extracts only digital document information which is accessed by the specific person on the basis of access history information about the designated specific person, sets additional information indicating whether each document file of the extracted digital document information is related to the lawsuit, and outputs the document files related to the lawsuit on the basis of the additional information.

PTL 2 discloses a forensic system which displays recorded digital information, sets user specification information indicating whether each of a plurality of document files is related to any one of the users included in the user information, sets settings such that the set user specification information is recorded in a storage unit, designates at least one or more users, searches for a document file in which the user specification information corresponding to the designated user is set, sets additional information indicating whether the searched document file is related to the lawsuit on a display unit, and outputs the document file related to the lawsuit on the basis of the additional information.

PTL 3 discloses a forensic system which receives the designation of at least one or more document files included in digital document information, receives designation indicating a language used to translate the designated document file, translates the designated document file into the designated language, extracts a common document file indicating the same content as the designated document file from digital document information recorded in a recording unit, generates translation-related information indicating that the extracted common document file is translated by quoting the content of the translated document file, and outputs a document file related to the lawsuit on the basis of the translation-related information.

CITATION LIST

Patent Literature

[PTL 1] JP-A-2011-209930
[PTL 2] JP-A-2011-209931
[PTL 3] JP-A-2012-032859

SUMMARY OF INVENTION

Technical Problem

However, for example, in the forensic systems disclosed in PTL 1 to PTL 3, a huge amount of document information of the users who use a plurality of computers and servers is collected.

In an operation of classifying whether a huge amount of digital document information is appropriate as the evidence exhibit of the lawsuit, a user, who is called a reviewer, needs to visibly check the digital document information and to classify each document information item. Therefore, it takes a lot of effort and time to perform the operation.

The invention has been made in view of the above-mentioned problems and an object of the invention is to provide a forensic system, a forensic method, and a forensic program which can reduce the burden of the reviewer who reviews documents.

Solution to Problem

According to an aspect of the invention, there is provided a forensic system that acquires digital information recorded in a plurality of computers or servers and analyzes connection of the acquired digital information to a lawsuit. The forensic system includes: a result information receiving unit that receives result information which is a determination result of connection between the lawsuit and a document group including a predetermined number of documents, which is extracted from document data included in the digital information, by a user; an element selection unit that calculates evaluation values of elements which commonly appear in the document group in each result information item from the characteristics of the elements and selects the elements on the basis of the evaluation values; a score calculation unit that calculates a score of each document in the document data from the selected elements included in each document of the document data and the evaluation values of the selected elements; and a recall ratio calculation unit that calculates a recall ratio related to the determination of the connection to the lawsuit on the basis of the score.

The term "document" means information including one or more words. Examples of the document include electronic mail, a presentation document, a table calculation document, a meeting document, a contract, an organization chart, and a business plan.

The term "document data" means a set of documents.

The "document group" means a subset of the document data which is a set of documents. The document data may indicate all documents whose connection to a lawsuit needs to be determined and the document group may mean documents whose connection to the lawsuit is determined by the user in the document data.

The term "determination of connection" is determining whether a document needs to be submitted to the lawsuit. For example, the determination of connection may be an action of giving a classification code according to the degree of connection.

The term "result information" indicates the determination result of connection between a document and the lawsuit by the user. The result information may represent a classification code which is given to the document by the user and indicates the degree of connection to the lawsuit.

The "result information receiving unit" receives the result information about the determination result of the document by the user.

The "element" means a component of the document, such as a word, a symbol, or a figure included in the document. For example, the element may be each phoneme, such as a morpheme which is the smallest phonetic unit that can be divided without losing its meaning in a given language.

The "element selection unit" selects the elements from the evaluation values of the elements. The element selection unit may extract the elements which commonly appear in each document having the same determination result in the determination of connection to the lawsuit by the user. In addition, the element selection unit may calculate the evaluation value on the basis of the amount of transmitted information of the element. The element selection unit may select the element on the basis of the sum of the evaluation values. The element selection unit may arrange the elements in descending order of the evaluation values, extract the elements until the sum of the evaluation values of the elements reaches the unique target value, and select the extracted elements.

The term "evaluation value" means a value indicating the characteristics of the element. The evaluation value may indicate the amount of transmitted information of the element.

The term "amount of transmitted information" means an amount indicating the interdependence between two probability variables in probability theory and information theory. Specifically, the amount of transmitted information may indicate the dependence between the element and the determination result of connection to a document including the element.

The term "unique target value" means the value of a target recall ratio. The unique target value may be expressed as a percentage.

The "score calculation unit" calculates the score of a document. For example, the score calculation unit may calculate, as the score, the sum of the evaluation values of the elements included in the document.

The "recall ratio" relates to the determination of connection to the lawsuit. The recall ratio may be an index indicating how well the system automatically reproduces the determination of connection by a human.

The "recall ratio calculation unit" calculates the recall ratio. For example, the recall ratio calculation unit may evaluate the value of the score given to the document by the system according to the invention and calculate the rate of consistency between the determination of connection by the user and the determination of connection by the system.

The recall ratio calculation unit may calculate the recall ratio from the percentage of the documents of the document group in the documents with a predetermined score or more among the documents whose scores have been calculated. In addition, the recall ratio calculation unit may arrange the documents whose scores have been calculated in the document data in descending order of the scores, extract a predetermined percentage of documents in descending order of the scores, and calculate, as the recall ratio, the percentage of the document group in the extracted documents.

The forensic system according to the invention may further include an automatic determination unit that determines the connection of a document, which has a score greater than a predetermined threshold value, to the lawsuit.

The "automatic determination unit" automatically determines the connection of the document to the lawsuit. For example, when the score which is given to the document by the score calculation unit is greater than the predetermined threshold value, the automatic determination unit may determine that the document is connected to the lawsuit.

The forensic system according to the invention may further include an extraction unit that extracts a document group including a predetermined number of documents from the document data included in the digital information and a display unit that displays the extracted document group on a screen.

The "extraction unit" extracts a document group from the document data in the digital information. The extraction unit may extract the document group on the basis of attributes, such as the update date and time of the document data. In addition, the extraction unit may have a function of extracting the document group from the document data using random sampling.

The "display unit" displays the extracted document group. The display unit may be a display device such as a client terminal used by the user.

The forensic system according to the invention may further include an element re-selection unit that re-selects elements using the sum of the evaluation values of the elements and a difference between the unique target value and the recall ratio when the recall ratio is less than the unique target value.

The "element re-selection unit" re-selects the elements selected by the element selection unit.

When the recall ratio is less than the unique target value, the element re-selection unit may extract elements from a set of elements except for the elements, which have been extracted from the elements until the sum of the evaluation values of the elements reaches the difference between the unique target value and the recall ratio, until the recall ratio is greater than the unique target value, and select the extracted elements.

When the recall ratio is less than the unique target value, the score calculation unit may further calculate a second score of each document in the document data, using the elements selected by the element re-selection unit and the evaluation values of the elements re-selected by the element re-selection unit, and compose the scores and the second scores to re-calculate the score of each document in the document data.

The "second score" means the score of the document which is re-calculated by the score calculation unit using the elements re-selected by the element re-selection unit.

According to another aspect of the invention, there is provided a forensic method that acquires digital information recorded in a plurality of computers or servers, analyzes connection of the acquired digital information to a lawsuit, and causes a computer to perform: a step of receiving result information which is a determination result of connection between the lawsuit and a document group including a predetermined number of documents, which is extracted from document data included in the digital information, by a user; a step of calculating evaluation values of elements which commonly appear in the document group in each result information item from the characteristics of the elements and selecting the elements on the basis of the evaluation value; a step of calculating a score of each document in the document data from the selected elements included in each document of the document data and the evaluation values of the selected elements; and a step of calculating a recall ratio related to the determination of the connection to the lawsuit on the basis of the score.

According to another aspect of the invention, there is provided a forensic program that acquires digital information recorded in a plurality of computers or servers, analyzes connection of the acquired digital information to a lawsuit, and causes a computer to implement: a function of receiving result information which is a determination result of connection between the lawsuit and a document group including a predetermined number of documents, which is extracted from document data included in the digital information, by a user; a function of calculating evaluation values of elements which commonly appear in the document group in each result information item from the characteristics of the elements and selecting the elements on the basis of the evaluation values; a function of calculating a score of each document in the document data from the selected elements included in each document of the document data and the evaluation values of the selected elements; and a function of calculating a recall ratio related to the determination of the connection to the lawsuit on the basis of the score.

Advantageous Effects of Invention

The forensic system, the forensic method, and the forensic program according to the invention perform a step of receiving result information which is a determination result of connection between the lawsuit and a document group including a predetermined number of documents, which is extracted from document data included in the digital information, by a user; a step of calculating evaluation values of elements which commonly appear in the document group in each result information item from the characteristics of the elements and selecting the elements on the basis of the evaluation value; a step of calculating a score of each document in the document data from the selected elements included in each document of the document data and the evaluation values of the selected elements; and a step of calculating a recall ratio related to the determination of the connection to the lawsuit on the basis of the score. Therefore, even when the system is automatically performed, it is possible to verify the coincidence between the determination of the system and the determination of the human and to improve the accuracy of determination.

The element selection unit according to the invention selects the elements on the basis of the sum of the evaluation values. Therefore, it is possible to reduce the number of elements used by the system. Therefore, it is possible to reduce noise (which means a score allocated to the document which is not connected to the lawsuit).

The element selection unit according to the invention arranges the elements in descending order of the evaluation values, extracts the elements until the sum of the evaluation values of the elements reaches the unique target value, and selects the extracted elements. Therefore, it is possible to reduce the number of elements used by the system. Therefore, it is possible to reduce noise.

The recall ratio calculation unit according to the invention calculates the recall ratio from the percentage of the documents of the document group in the documents with a predetermined score or more among the documents whose scores have been calculated. Therefore, it is possible to evaluate the tendency of the system in the determination of connection from the scores of the documents and to determine the coincidence between the tendency of the system in the determination of connection and the tendency of the user in the determination of connection.

The recall ratio calculation unit according to the invention arranges the documents whose scores have been calculated in the document data in descending order of the scores, extracts a predetermined percentage of documents in descending order of the scores, and calculates the percentage of the document group in the extracted documents as the recall ratio. Therefore, it is possible to evaluate the tendency of the system in the determination of connection from the scores of the documents and to determine the coincidence between the tendency of the system in the determination of connection and the tendency of the user in the determination of connection.

The forensic system according to the invention further includes the automatic determination unit that determines the connection between a lawsuit and the document with a score greater than a predetermined threshold value. Therefore, it is possible to automatically determine the connection between the document and the lawsuit on the basis of the tendency of the user in the determination of the connection.

The forensic system according to the invention further includes the extraction unit that extracts a document group including a predetermined number of documents from the document data included in the digital information and the display unit that displays the extracted document group on the screen. Therefore, it is possible to extract the document whose connection is determined by the user and to display the document on the terminal of the user.

The forensic system according to the invention further includes the element re-selection unit that re-selects elements using the sum of the evaluation values of the elements and the difference between the unique target value and the recall ratio when the recall ratio is less than the unique target value. Therefore, when the recall ratio does not reach a target value, it is possible to re-select the elements used to calculate the scores and to improve the determination accuracy of connection.

When the recall ratio is less than the unique target value, the element re-selection unit according to the invention extracts elements from a set of elements except for the elements, which have been extracted from the elements until the sum of the evaluation values of the elements reaches the difference between the unique target value and the recall ratio, until the recall ratio greater than the unique target value, and selects the extracted elements. Therefore, when the recall ratio does not reach a target value, it is possible to re-select the elements used to calculate the scores from elements different from the previously used elements and to improve the determination accuracy of connection.

When the recall ratio is less than the unique target value, the score calculation unit according to the invention calculates the second score of each document in the document data using the elements selected by the element re-selection unit and the evaluation values of the elements re-selected by the element re-selection unit and composes the score and the second score to re-calculate the score of each document in the document data. Therefore, it is possible use a composite score of the previous score and the second score as the score and to improve the recall ratio.

BRIEF DESCRIPTION OF DRAWINGS

FIG. 2 is a diagram schematically illustrating a review screen according to the first embodiment of the invention.

DESCRIPTION OF EMBODIMENTS

First Embodiment

Figure 1:
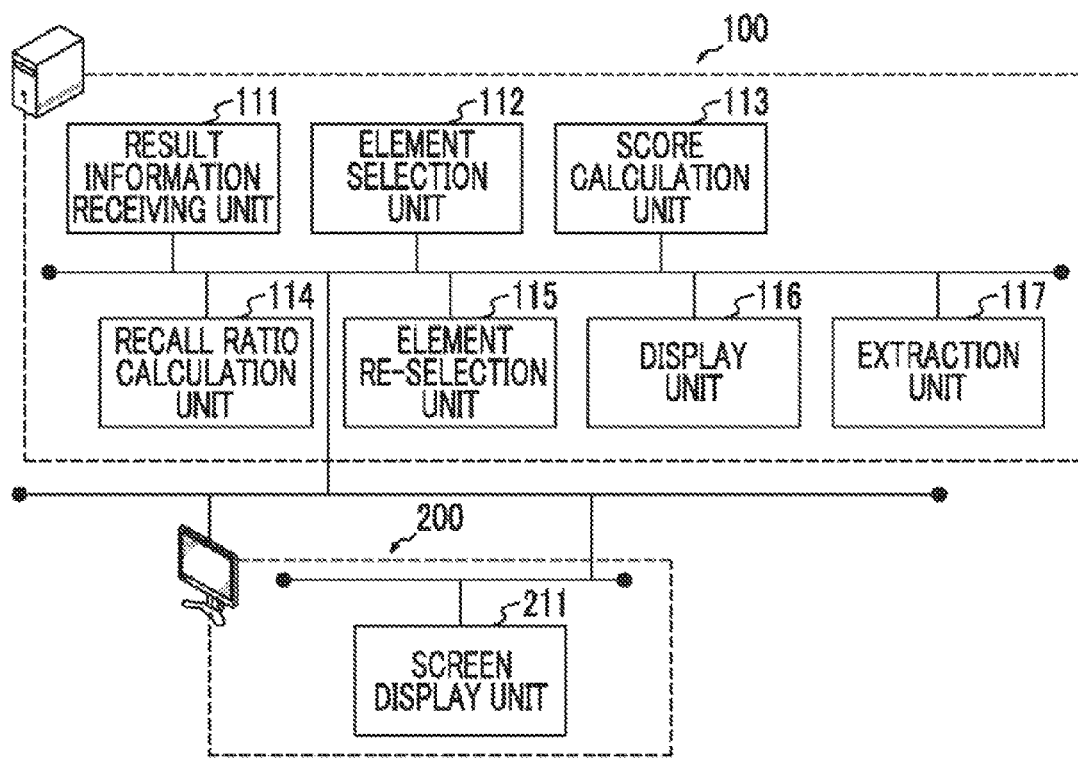
FIG. 1 is a block diagram illustrating a forensic system according to a first embodiment of the invention.

Hereinafter, a first embodiment of the invention will be described with reference to FIGS. 1 to 4.

A forensic system according to a first embodiment of the invention acquires digital information which is recorded in a plurality of computers or servers and analyzes the connection of the acquired digital information to a lawsuit. The forensic system includes: a result information receiving unit 111 that receives result information which is the determination result of connection between the lawsuit and a document group including a predetermined number of documents, which is extracted from document data included in the digital information, by a user; an element selection unit 112 that calculates evaluation values of elements which commonly appear in the document group in each result information item from the characteristics of the elements and selects the elements on the basis of the evaluation values; a score calculation unit 113 that calculates the score of each document in the document data from the selected element included in each document of the document data and the evaluation values of the selected elements; and a recall ratio calculation unit 114 that calculates a recall ratio related to the determination of the connection to the lawsuit on the basis of the score.

The forensic system may further include an extraction unit 117 that extracts the document group including the predetermined number of documents from the document data included in the digital information and a display unit 116 that displays the extracted document group on a screen.

The forensic system may further include an element re-selection unit 115 that re-selects elements using the sum of the evaluation values of the elements and a difference between a unique target value and the recall ratio when the recall ratio is less than the unique target value.

The forensic system includes a computer or a server and a CPU executes a program recorded in a ROM on the basis of various inputs to operate as various functional units. The program may be stored in a storage medium, such as a CD-ROM, or it may be distributed through a network, such as the Internet, and then installed in the computer.

In this embodiment, a user who is called a reviewer determines connection to the lawsuit in order to extract a document required to be submitted for the lawsuit from the document data. The document means information including one or more words. Examples of the document include electronic mail, a presentation document, a table calculation document, a meeting document, a contract, an organization chart, and a business plan. In addition, scan data can be treated as the document. In this case, the forensic system may include an optical character reader (OCR) device such that the scan data can be converted into text data. When the scan data is changed to text data by the OCR device, it is possible to analyze or search for the elements, which will be described below, from the scan data.

The document data is a set of documents. The document data indicates all documents whose connection to the lawsuit needs to be determined and the document group means documents whose connection to the lawsuit is determined by the user in the document data. The operation of the system or the user determining whether the document is connected to the lawsuit is referred to as a review. In the review, the document groups, which are documents to be reviewed, are classified into a plurality of types on the basis of the degree of connection to the lawsuit or how the documents are connected to the lawsuit.

FIG. 1 is a block diagram illustrating the forensic system according to the first embodiment. In this embodiment, the forensic system includes a server apparatus 100 and a client terminal 200.

The server apparatus 100 and the client terminal 200 are connected through a communication network. The communication network means a wired or wireless communication line. For example, the communication network is a telephone line or an Internet line.

The client terminal 200 includes a screen display unit 211 that displays a review screen I1 shown in FIG. 2. The reviewer is connected to the server apparatus 100 through the client terminal 200 and performs a review on the review screen I1.

The server apparatus 100 includes the result information receiving unit 111, the element selection unit 112, the score calculation unit 113, the recall ratio calculation unit 114, the element re-selection unit 115, the display unit 116, and the extraction unit 117.

In this embodiment, each component is provided in the server apparatus 100. However, each component may be provided in another apparatus.

Each component shown in FIG. 1 will be described. The result information receiving unit 111 receives the review result of the document by the reviewer. The review result is received as the result information. In the result information, the degree of connection of each document to the lawsuit may be indicated by codes.

The element selection unit 112 extracts elements which commonly appear in each document in each result information item which is the review result of each document and selects elements used for the next process from the evaluation values of the elements.

The element is a component of the document, such as a word, a symbol, or a figure in the document. For example, the element may be a phoneme, such as a morpheme which is the smallest phonetic unit that can be divided without losing its meaning in a given language.

The evaluation value means a value indicating the characteristics of the element. The evaluation value may indicate the amount of transmitted information of the element.

The element selection unit 112 may calculate the evaluation value on the basis of the amount of transmitted information of the element.

The amount of transmitted information means an amount indicating the interdependence between two probability variables in probability theory and information theory. Specifically, the amount of transmitted information may indicate the dependence between the element and the determination result of connection to a document including the element. For example, the element selection unit 112 can select the elements with a large amount of transmitted information.

The element selection unit 112 may select the elements on the basis of the sum of the evaluation values. In addition, the element selection unit 112 may arrange the elements in descending order of the evaluation values, extract the elements until the sum of the evaluation values of the elements reaches a unique target value, and select the extracted elements.

The unique target value indicates the value of a target recall ratio. The unique target value may be expressed as a percentage.

The score calculation unit 113 calculates the score of the document. For example, the score calculation unit 113 can calculate the sum of the evaluation values included in the document as the score.

In addition, when the recall ratio is less than the unique target value, the score calculation unit 113 may calculate the second score of each document in the document data using the elements selected by the element re-selection unit 115 and the evaluation values of the elements re-selected by the element re-selection unit 115 and compose the score and the second score to re-calculate the score of each document in the document data, which will be described below.

The second score means the second or subsequent score of each document calculated by the score calculation unit 113.

The recall ratio calculation unit 114 calculates the recall ratio of the process of the score calculation unit 113. For example, the recall ratio calculation unit 114 may evaluate the value of the score which is given to the document by the server apparatus 100 and calculate the reproducibility of the review result by the reviewer.

The recall ratio is related to the determination of connection to the lawsuit. The recall ratio may be an index indicating how well the system automatically reproduces the determination of connection by the human.

The recall ratio calculation unit 114 may calculate the recall ratio from the percentage of the documents of the document group in the documents with a predetermined score or more among the documents whose scores have been calculated. In addition, the recall ratio calculation unit 114 may arrange each document whose score has been calculated in the document data in descending order of the scores, extract a predetermined percentage of documents in descending order of the scores, and calculate the percentage of the document group in the extracted documents as the recall ratio.

The extraction unit 117 may extract the document group from the document data in the digital information. The extraction unit 117 may extract the document group using random sampling. In addition, the extraction unit 117 may extract the document group on the basis of attributes such as the update date and time of the documents. The extraction unit 117 may have a function of extracting the document group from the document data using random sampling.

The display unit 116 displays the extracted document group. The display unit 116 displays the extracted document group on the client terminal 200 used by the user.

The element re-selection unit 115 re-selects the element selected by the element selection unit 112. When the recall ratio is less than the unique target value, the element re-selection unit 115 may extract elements from a set of elements except for the elements which have been extracted from the elements until the sum of the evaluation values of the elements reaches the difference between the unique target value and the recall ratio, until the recall ratio is greater than the unique target value, and select the elements.

Next, the process flow of the forensic system will be described with reference to FIGS. 3 and 4.

Figure 3:
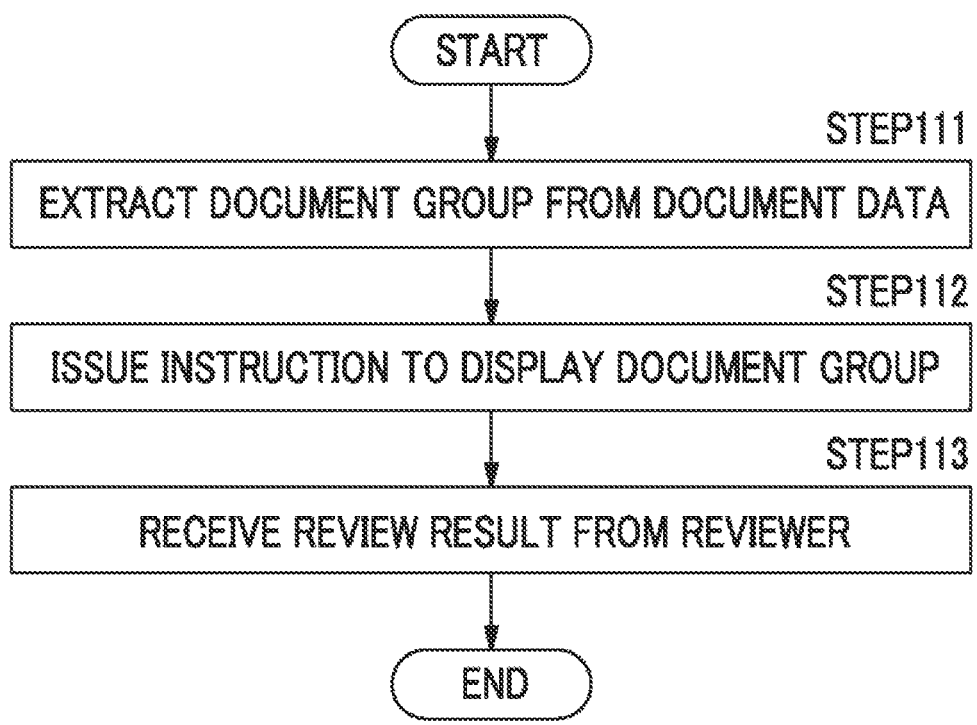
FIG. 3 is a flowchart illustrating the flow of a teacher data creation process according to the first embodiment of the invention.

FIG. 3 is a chart illustrating a process related to a teacher data creation flow. The forensic system performs a process of determining the connection of other document data on the basis of the characteristics of the review result of teacher data by the reviewer.

First, the extraction unit 117 extracts a document group to be presented to the reviewer from the collected document data using random sampling (STEP111). Then, an instruction is issued to the screen display unit 211 of the client terminal 200 such that the display unit 116 displays the extracted document group on a document display screen I1. In this case, an instruction is issued such that the display unit 116 displays the documents arranged in chronological order. When receiving the instruction, the screen display unit 211 displays the document display screen I1 on the client terminal 200 (STEP112).

The reviewer sees and reviews the documents displayed on the document display screen I1. Specifically, classification codes are given to the documents according to the degree of connection between the documents and the lawsuit. The result information receiving unit 111 receives the classification codes given by the reviewer as the result information (STEP113). The document group reviewed by the reviewer is transmitted as the teacher data to the next process.

Figure 4:
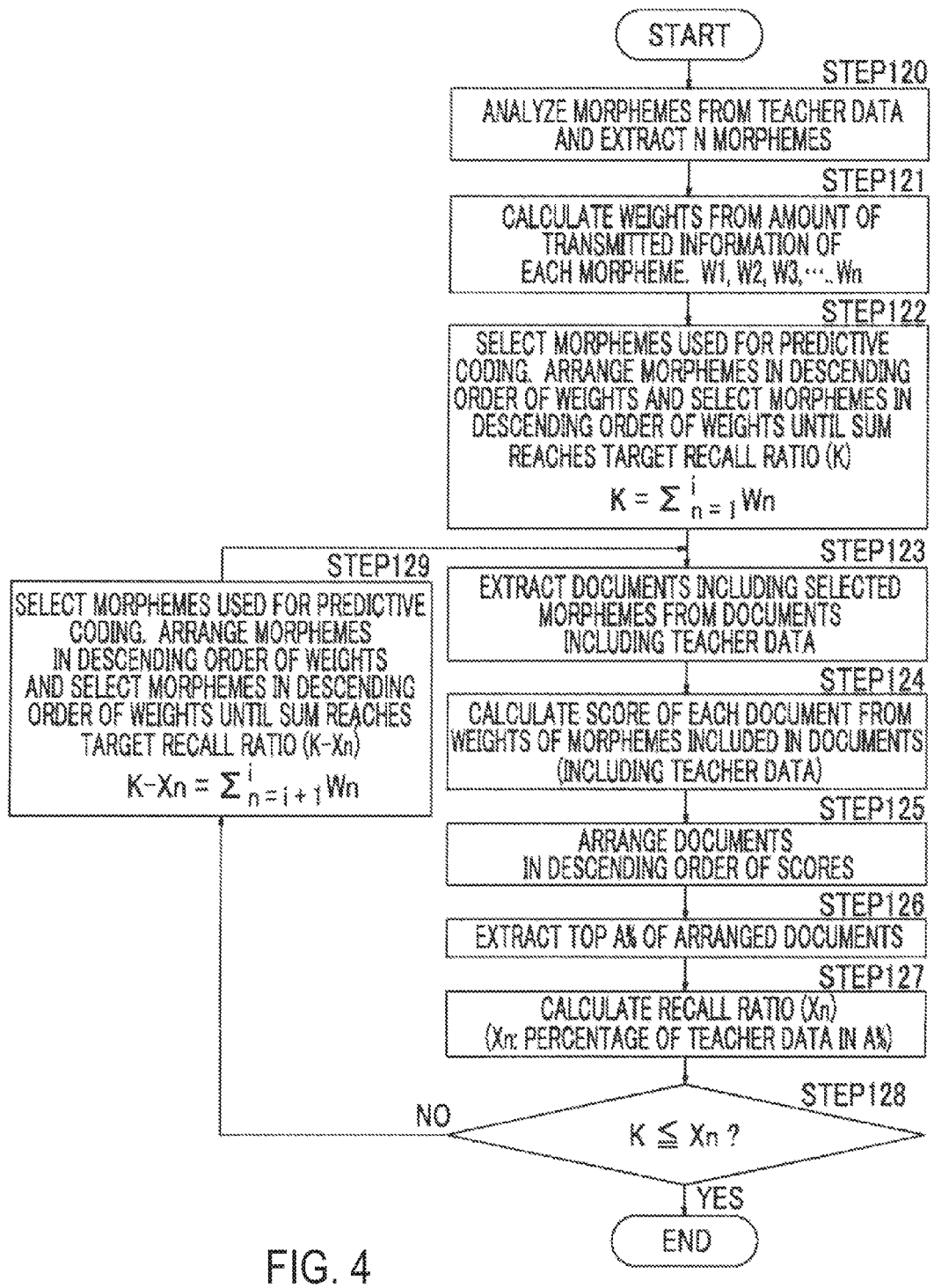
FIG. 4 is a flowchart illustrating the flow of a recall ratio improvement process according to the first embodiment of the invention.

FIG. 4 is a chart illustrating a process related to a recall ratio improvement flow.

The element selection unit 112 performs a process of analyzing the teacher data and selecting the elements. Specifically, the element selection unit 112 extracts, as the elements, N morphemes which commonly appear in the documents having a common classification code given thereto (STEP120). The evaluation values of the extracted morphemes are calculated on the basis of the amount of transmitted information of each morpheme (STEP121). For example, it is assumed that the evaluation value of the first extracted morpheme is $Wgt_1$, the evaluation value of the second extracted morpheme is $Wgt_2$, and the evaluation value of the N-th extracted morpheme is $Wgt_n$. The element selection unit 112 selects the morphemes for performing the next process using the evaluation values $Wgt_1$ to $Wgt_n$. Specifically, the element selection unit 112 arranges the morphemes in descending order of the evaluation values and selects m morphemes in descending order of the evaluation values until the sum of the evaluation values satisfying the following Expression (1) reaches the unique target value (K: K is an arbitrary constant).

$$K=\Sigma_{i=1}^{m} wgt_i \qquad \text{[Expression 1]}$$

K: a unique target value $wgt_i$: the evaluation value of an i-th morpheme

In this embodiment, the unique target value indicates a target recall ratio.

Then, the score calculation unit 113 extracts documents including the selected m morphemes from the document data (STEP130) and calculates the score of each document on the basis of the evaluation values of the included morphemes using the following Expression (2) (STEP131). In this case, the score calculation unit 113 also calculates the score of the teacher data.

$$S_i=\Sigma_{i=0}^{N} i*(m_i*wgt_i^2)/\Sigma_{i=0}^{N} i*wgt_i^2 \qquad \text{[Expression 2]}$$

$S_i$: an i-th score $m_i$: an i-th morpheme $wgt_i$: the evaluation value of the i-th morpheme Then, the recall ratio calculation unit 114 arranges the documents (including the teacher data) in descending order of the scores (STEP140) and extracts the top A % (A is an arbitrary constant) of the arranged documents (STEP141). The recall ratio calculation unit 114 calculates a recall ratio $X_1$ ($X_n$: a recall ratio which is calculated by the n-th calculation operation of the recall ratio calculation unit 114) from the percentage of the teacher data included in the top A % of the documents (STEP142).

Then, the element re-selection unit 115 determines whether the recall ratio $X_1$ is greater than the target value K (STEP150). When the recall ratio $X_1$ is greater than the target value K (STEP150: YES), the element re-selection unit 115 ends the process. When the recall ratio $X_1$ is less than the target value K (STEP150: NO), the element re-selection unit 115 re-selects elements (STEP151). Specifically, the element re-selection unit 115 selects l morphemes in descending order of the evaluation values from the morphemes obtained by subtracting m morphemes used in the current process from N morphemes extracted by the element selection unit 112 until the sum of the evaluation values satisfying the following Expression (3) reaches the unique target value.

$$K - X_n = \Sigma_{i=m+1}^{l+m+1} wgt_i \qquad \text{[Expression 3]}$$

K: a unique target value
$W_i$: an i-th morpheme
$X_n$: an n-th recall ratio

The score calculation unit 113 extracts documents including the morphemes re-selected by the element re-selection unit 115 from the documents including the teacher data (STEP130: the second round) and calculates the second score $S_{1r}$ of each document using Expression (1). The score calculation unit 113 calculates the composite score $S_2$ of each document from the following Expression (4), using a residual error $\Delta_1$ ($\Delta_1 = S_{1r} - S_1$) between the first calculated score $S_1$ and the second score $S_{1r}$ (STEP131: the second round).

$$S_{i+1} = \sqrt{S_i^2 + \Delta_i^2} = \sqrt{S_1^2 + \sum_{k=1}^{i} \Delta_k^2} \qquad \text{[Expression 4]}$$

$$\text{where } \Delta_k = \begin{cases} S_{kr} - S_k & \text{for } S_{kr} \geq S_k \\ 0 & \text{for } S_{kr} < S_k \end{cases}$$

$S_i$: an i-th score
$S_{ir}$: an i-th second score
$\Delta i$: a composite score of the i-th score and the i-th second score The recall ratio calculation unit 114 re-calculates the recall ratio using the composite score $S_2$ and repeats the process from STEP130 to STEP151 until the recall ratio is greater than the target value K. Therefore, it is possible to improve the accuracy of the review process of the forensic system to the target recall ratio.

Another Embodiment

Next, another embodiment of the invention will be described with reference to FIGS. 5 and 6.

A forensic system according to another embodiment of the invention acquires digital information which is recorded in a plurality of computers or servers and analyzes the connection of the acquired digital information to a lawsuit. The forensic system includes: a result information receiving unit 111 that receives result information which is the determination result of connection between the lawsuit and a document group including a predetermined number of documents, which is extracted from document data included in the digital information, by a user; an element selection unit 112 that calculates evaluation values of elements which commonly appears in the document group in each result information item from the characteristics of the elements and selects the elements on the basis of the evaluation values; a score calculation unit 113 that calculates the score of each document in the document data from the selected elements included in each document of the document data and the evaluation values of the selected elements; and a recall ratio calculation unit 114 that calculates a recall ratio related to the determination of connection to the lawsuit on the basis of the score.

The forensic system according to this embodiment may further include an automatic determination unit 118 that determines the connection of a document with a score greater than a predetermined threshold value to the lawsuit.

Figure 5:
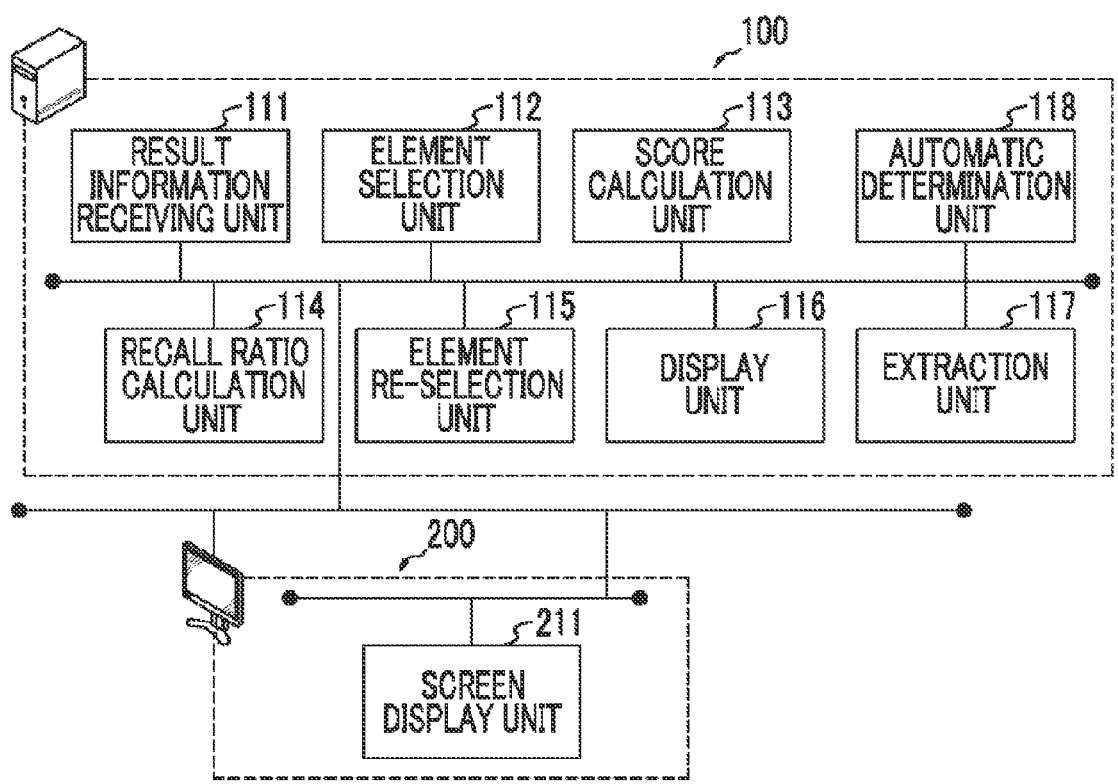
FIG. 5 is a block diagram illustrating a forensic system according to another embodiment of the invention.

FIG. 5 is a block diagram illustrating the forensic system according to another embodiment. In this embodiment, the forensic system includes a server apparatus 100 and a client terminal 200.

The client terminal 200 includes a screen display unit 211 that displays the review screen I1 shown in FIG. 2. The reviewer is connected to the server apparatus 100 through the client terminal 200 and reviews documents on the review screen I1.

The server apparatus 100 includes the result information receiving unit 111, the element selection unit 112, the score calculation unit 113, the recall ratio calculation unit 114, an element re-selection unit 115, a display unit 116, an extraction unit 117, and the automatic determination unit 118.

In this embodiment, each component is provided in the server apparatus 100. However, each component may be provided in a different apparatus.

The automatic determination unit 118 automatically determines the connection of the document to the lawsuit. For example, when the score which is given to the document by the score calculation unit 113 is greater than the predetermined threshold value, the automatic determination unit 118 may determine that the document is connected to the lawsuit.

Figure 6:
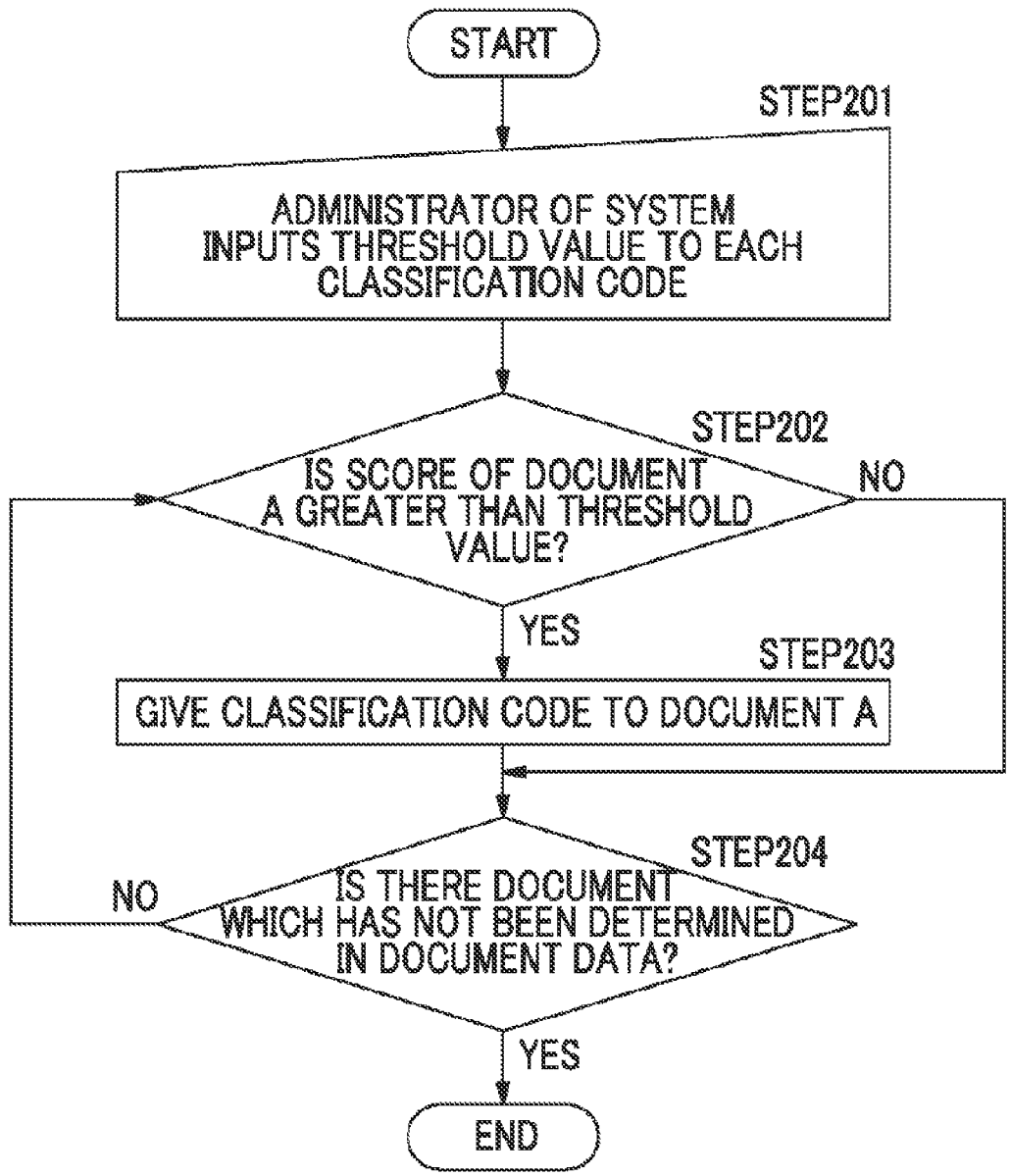
FIG. 6 is a flowchart illustrating a process flow of an automatic determination unit according to another embodiment of the invention.

FIG. 6 is a chart illustrating the process flow of the automatic determination unit 118. The process of the automatic determination unit starts after the process of STEP150 shown in FIG. 4 in the first embodiment is completed.

A system administrator inputs a threshold value for each classification code (STEP201). When the score of the document calculated by the score calculation unit 113 is greater than a threshold value, the automatic determination unit determines that the classification code related to the score greater than the threshold value is given to the document.

For example, when the score of a given document A calculated by the score calculation unit 113 is greater than the threshold value (STEP202: YES), the automatic determination unit 118 gives the classification code to the document A (STEP203). On the other hand, when the score is not greater than the threshold value (STEP202: NO), no classification code is given to the document A. When there is a document which has not been subjected to the process of determining whether the score is greater than the threshold value in the document data (STEP204: YES), the automatic determination unit 118 performs the process of STEP202 again. When there is no document which has not been subjected to the process of determining whether the score is greater than the threshold value in the document data (STEP204: NO), the automatic determination unit 118 ends the process.

The other structures and functions are the same as those in the first embodiment.

The forensic system can operate the following units to reduce the burden of the user who performs an operation of determining the connection of document data to a lawsuit and to verify the coincidence between the automatic determination of the system and the determination of the human, thereby improving the accuracy of determination: the result information receiving unit 111 that receives result information which is the determination result of connection between the lawsuit and a document group including a predetermined number of documents, which is extracted from document data included in the digital information, by the user; the element selection unit 112 that calculates the evaluation value of an element which commonly appears in the document group in each result information item from the characteristics of the element and selects the element on the basis of the evaluation value; the score calculation unit 113 that calculates the score of each document in the document data from the selected element included in each document of the document data and the evaluation value of the selected element; and the recall ratio calculation unit 114 that calculates the recall ratio related to the determination of connection to the lawsuit on the basis of the score.

The element selection unit 112 selects the elements on the basis of the sum of the evaluation values. Therefore, it is possible to reduce the number of elements used by the system. Therefore, it is possible to reduce noise.

The element selection unit 112 arranges the elements in descending order of the evaluation values, extracts the elements until the sum of the evaluation values of the elements reaches a unique target value, and selects the extracted elements. Therefore, it is possible to reduce the number of elements used by the system. Therefore, it is possible to reduce noise.

The recall ratio calculation unit 114 calculates the recall ratio from the percentage of the documents of the document group in the documents with a predetermined score or more among the documents whose scores have been calculated. Therefore, it is possible to evaluate the tendency of the system in the determination of connection from the scores of the documents and to determine the coincidence between the tendency of the system in the determination and the tendency of the user in the determination.

The recall ratio calculation unit 114 arranges the documents whose scores have been calculated in the document data in descending order of the scores, extracts a predetermined percentage of documents in descending order of the scores, and calculates the percentage of the document group in the extracted documents as the recall ratio. Therefore, it is possible to evaluate the tendency of the system in the determination of connection from the scores of the documents and to determine the coincidence between the tendency of the system in the determination and the tendency of the user in the determination.

The forensic system further includes the automatic determination unit 118 that determines the connection between a lawsuit and the document with a score greater than a predetermined threshold value. Therefore, it is possible to automatically determine the connection between the document and the lawsuit on the basis of the tendency of the user in the determination of the connection.

The forensic system further includes the extraction unit 117 that extracts a document group including a predetermined number of documents from the document data included in the digital information and the display unit 116 that displays the extracted document group on the screen. Therefore, it is possible to extract the document whose connection is determined by the user and to display the document on the terminal of the user.

The forensic system further includes the element re-selection unit 115 that re-selects elements using the sum of the evaluation values of the elements and the difference between the unique target value and the recall ratio when the recall ratio is less than the unique target value. Therefore, when the recall ratio does not reach a target value, it is possible to re-select the elements used to calculate the scores and to improve the determination accuracy of connection.

When the recall ratio is less than the unique target value, the element re-selection unit 115 extracts elements from a set of elements except for the elements, which have been extracted from the elements until the sum of the evaluation values of the elements reaches the difference between the unique target value and the recall ratio, until the recall ratio is greater than the unique target value, and selects the elements. Therefore, when the recall ratio does not reach a target value, it is possible to re-select the elements used to calculate the scores from elements different from the previously used elements and to improve the determination accuracy of connection.

When the recall ratio is less than the unique target value, the score calculation unit 113 calculates the second score of each document in the document data using the elements selected by the element re-selection unit 115 and the evaluation values of the elements re-selected by the element re-selection unit 115 and composes the score and the second score to re-calculate the score of each document in the document data. Therefore, it is possible use a composite score of the previous score and the second score as the score and to improve the recall ratio.

REFERENCE SIGNS LIST

100: SERVER APPARATUS
111: RESULT INFORMATION RECEIVING UNIT
112: ELEMENT SELECTION UNIT
113: SCORE CALCULATION UNIT
114: RECALL RATIO CALCULATION UNIT
115: ELEMENT RE-SELECTION UNIT
116: DISPLAY UNIT
117: EXTRACTION UNIT
118: AUTOMATIC DETERMINATION UNIT
200: CLIENT TERMINAL
211: SCREEN DISPLAY UNIT
I1: REVIEW SCREEN

The invention claimed is:

1. A forensic system that acquires digital information recorded in a plurality of computers or servers and analyzes connection of the acquired digital information to a lawsuit, comprising:
at least one processor acting as:
a result information receiving unit that receives result information which is a determination result of connection between the lawsuit and a document group including a predetermined number of documents, which is extracted from document data included in the digital information, by a user;
an element selection unit that calculates evaluation values of elements which commonly appear in the document group in each result information item from characteristics of the elements and selects the elements on the basis of the evaluation values, arranges the elements in a descending order of the evaluation values, extracts elements repeatedly until a sum of the evaluation values of the elements reaches a unique target value, and selects the extracted elements for improving an accuracy of the review process by the forensic system;

a score calculation unit that calculates a score of each document in the document data from the selected elements included in each document of the document data and the evaluation values of the selected elements;

a recall ratio calculation unit that calculates a recall ratio related to the determination of the connection to the lawsuit on the basis of the score;

an element re-selection unit that re-selects the elements using the sum of the evaluation values of the elements and the difference between the unique target value and the recall ratio when the recall ration is less than the unique target value and extracts elements from a set of elements except for the elements, which have been extracted from the elements until the sum of the evaluation values of the elements reaches the difference between the unique target value and the recall ratio, until the recall ratio is greater than the unique target value, and selects the extracted elements; and the score calculation unit further calculates a second score of each document in the document data, using the elements selected by the element re-selection unit and the evaluation values of the elements selected by the element re-selection unit, and composes the scores and the second scores to re-calculate the score of each document in the document data, when the recall ratio is less than the unique target value, the score calculation unit further calculates a second score of each document in the document data.

2. The forensic system according to claim 1, wherein the element selection unit selects the elements on the basis of a sum of the evaluation values.

3. The forensic system according to claim 1, wherein the recall ratio calculation unit calculates the recall ratio from a percentage of documents of the document group with a predetermined score or more among the documents whose scores have been calculated.

4. The forensic system according to claim 1, wherein the recall ratio calculation unit arranges documents whose scores have been calculated in the document data in descending order of the scores, extracts a predetermined percentage of documents in descending order of the scores, and calculates, as the recall ratio, a percentage of the document group in the extracted documents.

5. The forensic system according to claim 1, wherein the element selection unit calculates the evaluation value on the basis of an amount of transmitted information of the element.

6. The forensic system according to claim 1, further comprising:
an automatic determination unit that determines a connection of a document, which has a score greater than a predetermined threshold value, to the lawsuit.

7. The forensic system according to claim 1, further comprising:
an extraction unit that extracts a document group including a predetermined number of documents from the document data included in the digital information; and
a display unit that displays the extracted document group on a screen.

8. The forensic system according to claim 7, wherein the extraction unit has a function of extracting the document group from the document data using random sampling.

9. A forensic method that acquires digital information recorded in a plurality of computers or servers, analyzes connection of the acquired digital information to a lawsuit, and causes a computer to perform:

a step of receiving result information which is a determination result of connection between the lawsuit and a document group including a predetermined number of documents, which is extracted from document data included in the digital information, by a user;

a step of calculating evaluation values of elements which commonly appear in the document group in each result information item from characteristics of the elements and selecting the elements on the basis of the evaluation values, arranging the elements in a descending order of the evaluation values, extracting elements repeatedly until a sum of the evaluation values of the elements reaches a unique target value, and selecting the extracted elements for improving an accuracy of the review process;

a step of calculating a score of each document in the document data from the selected elements included in each document of the document data and the evaluation values of the selected elements;

a step of calculating a recall ratio related to the determination of the connection to the lawsuit on the basis of the score;

a step of re-selecting the elements using the sum of the evaluation values of the elements and the difference between the unique target value and the recall ratio when the recall ration is less than the unique target value and extracting elements from a set of elements except for the elements, which have been extracted from the elements until the sum of the evaluation values of the elements reaches the difference between the unique target value and the recall ratio, until the recall ratio is greater than the unique target value, and selects the extracted elements; and a step of calculating a second score of each document in the document data, using the elements and the evaluation values of the elements selected by the element, and composing the scores and the second scores to re-calculate the score of each document in the document data, when the recall ratio is less than the unique target value, the score calculation unit further calculates a second score of each document in the document data.

10. A system that acquires digital information recorded in a plurality of computers or servers, analyzes connection of the acquired digital information to a lawsuit, comprising:
at least one processor; and
memory storing instructions configured to instruct the at least one processor to perform:
a function of receiving result information which is a determination result of connection between the lawsuit and a document group including a predetermined number of documents, which is extracted from document data included in the digital information, by a user;
a function of calculating evaluation values of elements which commonly appear in the document group in each result information item from the characteristics of the elements and selecting the elements on the basis of the evaluation values, arranging the elements in a descending order of the evaluation values, extracting elements repeatedly until a sum of the evaluation values of the elements reaches a unique target value, and selecting the extracted elements for improving an accuracy of the review process by the system;

a function of calculating a score of each document in the document data from the selected elements included in each document of the document data and the evaluation values of the selected elements;

a function of calculating a recall ratio related to the determination of the connection to the lawsuit on the basis of the score;

a function of re-selecting the elements using the sum of the evaluation values of the elements and the difference between the unique target value and the recall ratio when the recall ration is less than the unique target value and extracting elements from a set of elements except for the elements, which have been extracted from the elements until the sum of the evaluation values of the elements reaches the difference between the unique target value and the recall ratio, until the recall ratio is greater than the unique target value, and selects the extracted elements; and a function of calculating a second score of each document in the document data, using the elements and the evaluation values of the elements selected by the element, and composing the scores and the second scores to re-calculate the score of each document in the document data, when the recall ratio is less than the unique target value, the score calculation unit further calculates a second score of each document in the document data.

\* \* \* \* \*